United States Patent [19]

Lepetit et al.

[11] 3,949,122
[45] Apr. 6, 1976

[54] PROCESS FOR MAKING A METALLIC COATING ON SURFACES FORMED OF TITANIUM OR ANOTHER REFRACTORY METAL

[75] Inventors: Pierré T. Lepetit, Saint-Vrain; Andre R. Hivert, Pontoise, both of France

[73] Assignee: Office National d'Etudes et de Recherches Aerospatiales (O.N.E.R.A.), Chatillon-sous-Bagneux, France

[22] Filed: June 24, 1974

[21] Appl. No.: 482,662

[30] Foreign Application Priority Data
June 26, 1973 France ............................... 73.23295

[52] U.S. Cl. ............... 427/229; 427/253; 228/209; 29/198
[51] Int. Cl.² ......................................... C23C 13/02
[58] Field of Search ............ 148/6, 6.14 R, 6.3, 6.2; 117/118, 130 E; 29/198; 427/229, 253

[56] References Cited
UNITED STATES PATENTS

| 2,875,090 | 2/1959 | Galmiche | 148/6.3 |
|---|---|---|---|
| 3,535,103 | 10/1970 | Whitfield | 148/6.3 |

*Primary Examiner*—Ralph S. Kendall
*Assistant Examiner*—Charles R. Wolfe, Jr.
*Attorney, Agent, or Firm*—Larson, Taylor and Hinds

[57] ABSTRACT

To produce resisting metal coatings containing at least one brazing metal on surfaces formed of titanium or another refractory metal having at least one volatile halide, a coating of this halide of the brazing metal is applied to this surface, this halide being stable in the isolated state and when applied to the surface, the halogen of the said halide being able to form the volatile halide with the refractory metal; the surface thus coated is heated to a temperature which is sufficient to permit the reaction of the metal halide with the refractory metal to form the volatile halide, which escapes and to form the metal coating, bounded by diffusion of the brazing metal to the surface of the refractory metal.

12 Claims, 1 Drawing Figure

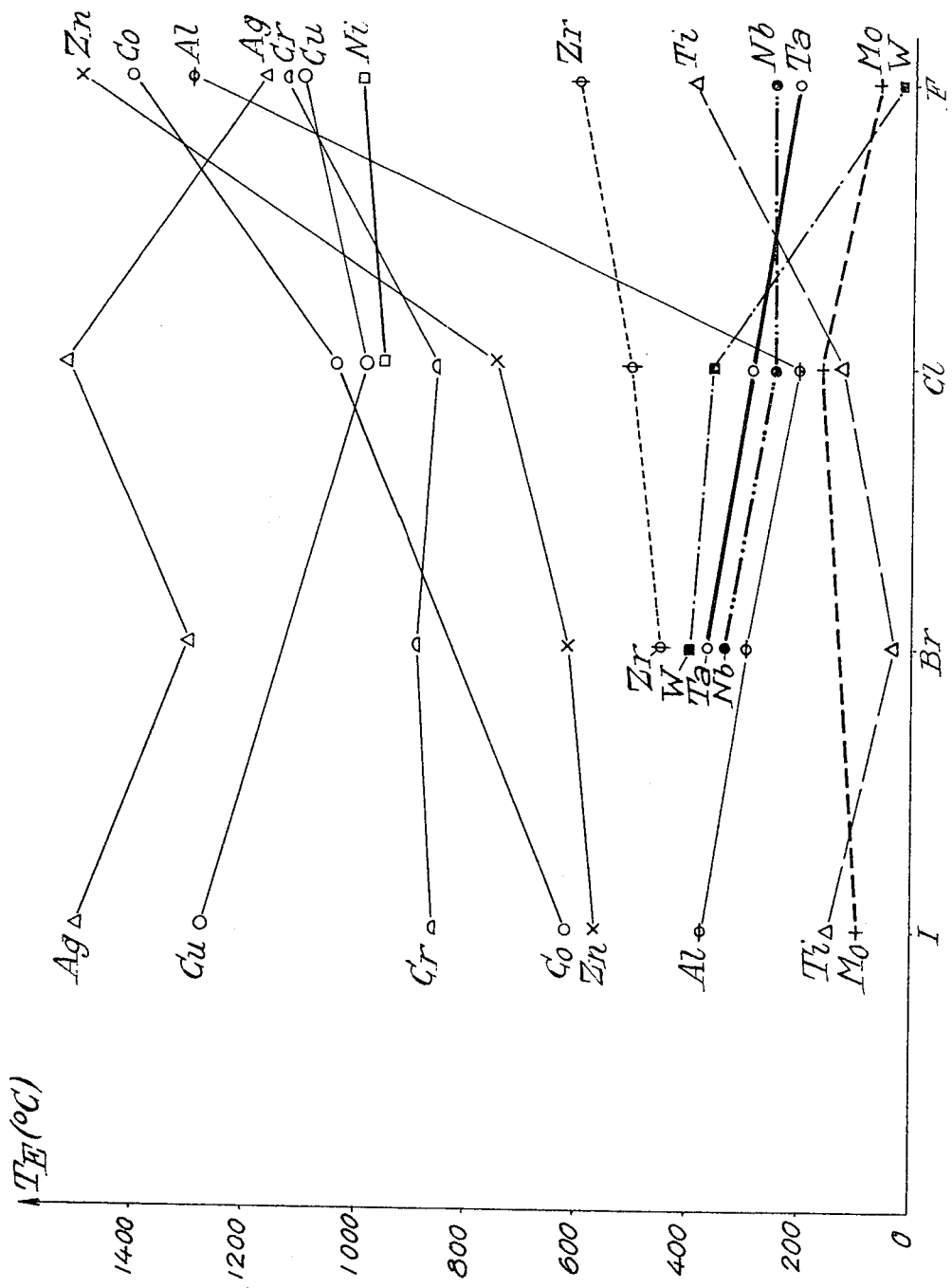

PROCESS FOR MAKING A METALLIC COATING ON SURFACES FORMED OF TITANIUM OR ANOTHER REFRACTORY METAL

The present invention relates to the production of metal coatings on surfaces formed of titanium or another refractory metal having at least one volatile halide, or consisting of an alloy of such metals.

It is known that the very important advantages of titanium and titanium alloys are due to their very interesting technological properties such as the very high resistance/density ratio (which can reach 400 when the resistance is expressed in decimal units), the high resilience and the unoxidisability. This has led to the wide use of titanium alloys, particularly for aeronautical construction purposes. Unfortunately, titanium alloys have several troublesome disadvantages such as the great susceptibility to corrosion under tension, a high coefficient of friction, a tendency to bind, a very poor if not non-existent wetting by conventional hard solders and a poor adhesion to their surfaces by protective paints. Attempts have been made to obviate these disadvantages by subjecting the said alloys to surface treatments, particularly an electrodeposition.

Unfortunately, it is extremly difficult, if not impossible, to industrially perform surface treatments, particularly an electrodeposition, suitable for titanium alloys because the deposits do not adhere sufficiently to the surface of these alloys due to the great affinity of titanium for oxygen (the formation of titanium oxide from titanium and oxygen is highly exothermic). This leads to a very rapid contamination of the surfaces of the alloy, which is an obstacle to obtaining adequate bonds between the substrate formed by the titanium alloy and the deposited layer.

Analogous problems occur with other refractory metals or alloys of refractory metals, particularly the following metals: tantalum, niobium, zirconium and their alloys. Moreover, molybdenum and tungsten, which have moderate oxide formation temperatures, are very difficult to coat electrolytically.

In the case of tantalum and the other refractory metals mentioned hereinbefore (except molybdenum and tantalum) the hard soldering (or "brazing") operations are also very difficult, mainly due to the affinity of oxygen for these metals.

It has in fact been proposed to hard solder (or braze) titanium with hard solders which contain aluminium, a metal which is able to reduce the titanium oxide layers, but this leads to a brazed joint with a low melting point and a brittle bond, due to the formation of intermetallic compounds, and which is susceptible to corrosion through a galvanic cell forming a humid atmosphere. Brazing by auto-diffusion in the solid state using high temperatures (of the order of 900° to 950°C) and very high pressures (of the order of 70 bars) to break the titanium oxide film by plastic deformation has also been proposed. However, it is unfortunately difficult to use this method on an industrial scale.

The present invention aims at making it possible to produce resistant metal coatings on surfaces formed by at least one refractory metal (particularly titanium) which is able to form at least one volatile halide, whereby this metal coating can inter alia then be used either for brazing, or for electrolytic coating, or the application of a paint to the surface formed by the coated refractory metal.

The advantage of the process according to the invention is that it makes it possible to obtain a metal coating not having the disadvantages of the known coatings, i.e. it is stable and resistant, of excellent quality and then permits, if desired, the attachment of coatings of hard solder (brazing alloy), or paint, or electrolytically applied coatings.

The object of the process of the invention is to produce a resistant metal coating which comprises at least one filler or, more specifically, brazing metal, i.e. a metal or alloy which can be used for establishing a brazed joint, on a surface formed by at least one refractory metal which is able to form at least one volatile halide, in which to the said surface is applied a coating of at least one halide of the said brazing metal, the said halide being stable in the isolated state and when applied to the said surface, the halogen of the said halide being able to form the said halide with the said refractory metal, and in which the said surface coated with the said coating is heated to a temperature which is sufficient to react the said metal halide with the said refractory metal to form the said volatile halide, which escapes and to form the said metal coating, attached by diffusion of the said brazing metal into the said surface.

The invention also has for its object a process for hard soldering on a surface formed by at least one refractory metal having at least one volatile halide, in which on the said surface a metal coating comprising at least one brazing metal is produced, namely by the process indicated hereinbefore for producing a metal coating by using as the metal halide a halide of the said brazing metal and in which the metal or the alloy forming the hard solder is melted on the surface coated with the said metal coating having the brazing metal for its base. Preferably, the brazing metal is the metal used to form the hard solder.

It also has for its object a process for producing an electrolytic coating on a surface formed by at least one refractory metal which is able to form at least one volatile halide, in which on the said surface a metal coating comprising at least one brazing metal is produced, namely by the process indicated hereinbefore for producing a metal coating by using, as the metal halide, a halide of the said brazing metal, and in which the electrodeposition of the metal to be electrodeposited is performed on the said surface coated with the said metal coating having the brazing metal for its base. Preferably, the brazing metal is the metal which is to be electrodeposited.

Within the scope of the invention, the refractory metal is chosen from the following group of metals: titanium, tantalum, molybdenum, niobium, tungsten and zirconium, whilst the brazing metal (applied in the form of a metal halide) is chosen from the following group of metals: silver, copper, nickel, aluminium, chromium, cobalt, iron, tin and zinc. The preferred metal halide is a fluoride or a chloride or contains a fluoride or a chloride.

The invention is based, on the one hand, on the pronounced reactivity of halogens relative to stable oxides of refractory metals which are eliminated by the halogen and, on the other hand, on the volatility of the halides, or at least of certain halides of refractory metals. Due to this volatility, when a refractory metal is brought into the presence of certain metal halides, at a temperature of about 500° to 600°C, a chemical occurs, and during that reaction the volatile halide of the refractory metal is evolved and the metal of the original halide is released. For example, in the case of copper fluoride and titanium, the following reaction is obtained:

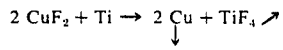

The halogen (and in this case particularly fluorine) of the halide is combined with the refractory metal (in this case titanium), even if the latter is partly oxidised, to give a volatile compound and liberate the metal (in this case copper) with which it was combined. This liberated metal is deposited on the free surface of the deoxidised refractory metal and diffuses towards the inside thereof.

Thus, simultaneously a cleaning action of the surface of the refractory metal member and the production, in the free state, of the brazing metal (that which was originally bonded to the halogen in the halide) are obtained. This brazing metal strongly adheres to the refractory metal substrate. At this temperature of 500° – 600°C, there is a diffusion of the brazing metal atoms towards the inside of the substrate from the surface to which the halide of the brazing metal was applied. On this well-attached brazing metal coating, it is possible to carry out hard soldering or the application of a coating of paint or an electrolytic deposit.

Thus the process according to the invention makes it possible to obtain thermochemically (reaction at a moderate temperature of the halide of the brazing metal with the refractory metal of the substrate) a surface coating of brazing metal which is well attached to the substrate due to the above-indicated diffusion mechanism.

The halide of the brazing metal is preferably in the form of fine particles dispersed in an appropriate liquid. For example the halide chosen is ground in a liquid which does not dissolve it, liquid such as cyclohexanone, with the optional addition of a stabilizing colloid such as methyl polymethacrylate. The coating or "paint" thus obtained can be applied to the surface to be treated by a conventional mechanical means such as with the brush or spray gun or by immersion i.e. immersing the member in a bath of fine halide particles dispersed in the appropriate liquid. After drying, the member is placed in an oven, in a vacuum or under an inert gas atmosphere and in particular argon, and the oven is rapidly heated to a temperature of at least 400°C. The bond between the halogen and the brazing metal in the halide is broken to the benefit of the bonding of the halogen, thus liberated with the refractory metal of the substrate, whereby the halide of the refractory metal escapes because it is volatile. By applying Berthollet's law, a complete reaction is generally obtained. The significance of the vacuum as compared with an inert gas atmosphere is that it aids the escape of the volatile halide.

Thus the cleaning of the oxidised surface to be coated and the application of the brazing metal to the substrate surface are performed simultaneously. The depth of the diffusion zone of the brazing metal atoms into the substrate metal depends directly on the temperature in the oven and the time during which the treated member is kept at this temperature. The thus obtained coatings either have directly the required surface property (wettability of hard solders, adhesiveness for paints, low coefficient of friction), or can easily receive the conventional deposits (e.g. electrolytic deposits).

The process according to the invention has the advantage of being very simple because there is no need to prepare the surface beforehand. The area to be coated can be easily localised by using masks which limit the areas to which the coating of fine particles in suspension is applied. It merely requires heating at a moderate temperature of about 400° to 800°C, generally for a short period of time in a conventional oven.

In the case of hard soldering it makes it possible to integrate into a single operation the coating of the surface which ensures the wettability of the hard solder, and the melting of the hard solder at a higher temperature.

Finally, it can easily be applied on an industrial scale, the size of the ovens being the sole limiting factor.

The choice of halides depends on the following requirements:

the halogen of the halide must be such that with the substrate metal (particularly titanium when the substrate is made from titanium) gives a volatile halide;

the halide chosen must be intrinsically stable under the operating conditions (temperature and pressure) of the subsequent thermal treatment, but this stability must not continue during the hot contact with the refractory metal or the refractory metal alloy, and more particularly titanium or titanium alloy, due to the necessary volatility of the halide or halides of the refractory metal or metals, volatility which leads to a reaction of the type described hereinbefore;

— it is also important to ensure that the halogen anion of the halide is as electro-negative as possible so that there is a maximum reactivity relative to the titanium oxide or other refractory metal oxide, hence fluorides and chlorides are preferably chosen;

— it is important to ensure that the metal cation of the halide is slightly electro-positive, so that it cannot be contaminated by the oxygen, and has a relatively low melting point so that it can be joined to the substrate metal by auto-diffusion, or form a liquid phase with another brazing metal at a temperature compatible with the refractory metal (less than 800°C for titanium);

— in all cases, the halide of the refractory metal must be more volatile than the halide of the brazing metal so as to permit a complete reaction of the halide with the refractory metal of the substrate by applying Berthollet's law.

On the attached graph are shown the boiling points of the halides of the refractory metals which can form the substrate and boiling points of the halides of the envisaged brazing metals, the boiling temperatures $T_E$ (in °C) being given in the ordinate and the different halogens in the abscissa being classified by increasing order of electro-negativity of the halogen anion towards the right. It can be seen, for example, that aluminium can only be deposited on refractory metals in fluoride form. It is important to choose a halide such that the difference in the vapour pressures between the fluoride of the refractory metal of the substrate and the fluoride of the brazing metal is as large as possible.

In the graph, the boiling points of the different saturated halides clearly show two fundamental groups of metals:

1. metals having volatile halides (Ti, Zr, Nb, Ta, Mo, W), which can therefore form the alloy bases or metals to be coated (curves in broken or continuous thick lines);

2. metals having slightly volatile halides (Ni, Cu, Ag, Co, Zn) which can therefore form the brazing metals (curves in continuous fine lines).

It is pointed out that there is an anomaly relative to one metal appearing in the graph, namely aluminium, because three of its halides (iodide, bromide and chloride) are volatile whilst one is only slightly volatile (fluoride). Therefore, in theory, aluminium can form either the metal to be coated (provided that fluorine is excluded from the halogen compounds of the brazing metals), or the brazing metal provided that only fluoride is used. In actual fact, the first function is without practical interest because electrodepositions on aluminium are easy. Thus aluminium is considered herein solely as a brazing metal (continuous fine lines).

Finally, it is pointed out that, in order to simplify the graph, only halogen-saturated halides are shown, but the invention is not limited to such halides. In fact, examples will be given hereinafter of non-saturated halides.

As regards the oven atmosphere, it is important, as indicated hereinbefore, to perform the heating in an oven in a vacuum. However, it is also possible to use an inert gas, particularly argon. Nitrogen must not be used because it can form nitrides.

A vacuum is preferred not only because it aids the escape of the volatile halides formed from the substrate metal or metals, but also because the neutral gases often contain impurities which can be troublesome.

Hereinafter examples of performing the process of the invention are given.

EXAMPLE 1

Silver coating on titanium alloys called TA6U (alloy consisting of 90% titanium, 6% aluminium and 4% vanadium).

Silver chloride AgCl is ground in the presence of cyclohexanone, to which has been added 2% methyl polymethacrylate, until a smooth "paint" is formed. This "paint" is applied by a brush to a TA6V sheet which has not received any prior treatment. After drying, the thus coated sheet is placed in an oven in a vacuum which is maintained at 600°C for 5 minutes. Thus a silver deposit is obtained which at the interface has a diffusion zone with the titanium alloy.

EXAMPLE 2

Diffusion of silver on the alloy TA6V

The operations of Example 1 are repeated, but this time the coated sheet is kept for 30 minutes in the oven at 850°C. In this case, no pure silver remains on the surface, but only a silver diffusion alloy in the alloy TA6V with a silver concentration gradient.

EXAMPLE 3

Copper coating on TA6V alloy

The operations of Example 1 are repeated, but the silver chloride AgCl is replaced by copper fluoride $CuF_2$. The result is analogous to that obtained in Example 1, whereby obviously a copper deposit is obtained instead of a silver deposit. However, there is a certain loss of copper fluoride by volatilization.

EXAMPLE 4

Copper coating on alloy TA6V

This is analogous to Example 3, but the copper fluoride $CuF_2$ is replaced by copper chloride CuCl. The latter compound has a boiling point of 1,490° C instead of 1,100° C in the case of $CuF_2$. Consequently, the losses by volatilization are considerably reduced and the copper deposit is more regular.

EXAMPLE 5

Nickel coating on TA6V alloy

This example is similar to Example 3, but the copper fluoride $CuF_2$ is replaced by nickel fluoride $NiF_2$ and a nickel deposit is obtained.

EXAMPLE 6

Copper coating on tantalum

The operations are the same as in Example 3, except for the fact that the sheet to be coated is of tantalum instead of the alloy TA6V.

EXAMPLES 7 and 8

Copper coating on tantalum

Example 6 is repeated, but the copper fluoride $CuF_2$ is replaced by calcined copper chloride $CuCl_2$ (Example 7) or preferably (Example 8) by copper chloride CuCl which does not have to be calcined because it is insoluble in water and is also less volatile.

EXAMPLE 9

Copper coating on molybdenum

Example 3 is repeated, except that the sheet to be treated is of molybdenum instead of TA6V alloy.

EXAMPLES 10 and 11

Copper coating on molybdenum

Example 9 is repeated, but the copper fluoride $CuF_2$ is replaced by calcined copper chloride $CuCl_2$ or copper chloride CuCl.

EXAMPLE 12

Copper coating on niobium

Example 3 is repeated, but the sheet to be treated is of niobium instead of the TA6V alloy.

EXAMPLES 13 and 14

Copper coating on niobium

Example 12 is repeated, but the copper fluoride $CuF_2$ is replaced by calcined copper chloride $CuCl_2$ or copper chloride CuCl.

EXAMPLE 15

Integrated coating and hard soldering of the alloy TA6V with silver-copper eutectic Two TA6V alloy sheets are coated with a silver chloride AgCl "paint" by the process of Example 1. After drying, a 50 micron thick hard solder film of silver-copper CuAg eutectic is inserted between the two "paint" coats (one on each sheet) and it is heated rapidly at 800° C in an oven in a vacuum. A very sound brazed joint is obtained between the two sheets. The wetting is excellent because the hard solder is carried by silver coats and not by titanium.

EXAMPLE 16

Integrated coating and hard soldering of a member made from TA6V alloy with copper The processes are the same as in Example 15, but the "paint" contains copper fluoride $CuF_2$ and not silver chloride AgCl, and the hard solder is formed by a 5 micron thick copper film and not a copper-silver eutectic film. Finally, the temperature is raised to 900° C instead of 800° C. By diffusion, the liquidus of the system is reached, and a liquid phase comprising mainly titanium and copper is formed and bonds by brazing the two TA6V alloy sheets.

EXAMPLE 17

Coating aluminium and TA6V alloy

The procedure is as in Example 1, but using aluminium fluoride $AlF_3$ in place of silver chloride AgCl. An Al — TA6V diffusion alloy is obtained.

EXAMPLE 18

Coating copper on tantalum with subsequent deposition of nickel

The procedure is initially as in Example 6, then nickel is electrodeposited on the copper surface coating. Thus an electrolytic deposit of nickel on a tantalum sheet is obtained which is not possible directly because of the total lack of adhesion between nickel and tantalum.

EXAMPLE 19

Hard soldering titanium on tantalum with nickel

A titanium sheet and a tantalum sheet are coated with nickel fluoride by proceeding as at the start of Example 1, except that the silver chloride AgCl is replaced by nickel fluoride $NiF_2$, and titanium and tantalum members are used instead of TA6V alloy members. Then, a 5 micron thick nickel sheet is placed between the two surfaces of titanium on the one hand and tantalum on the other, each being coated with nickel fluoride. In a vacuum oven, the temperature is rapidly raised to 805° C and this temperature is maintained for 15 minutes. The hard soldering of the titanium to the tantalum is perfectly sound.

EXAMPLE 20

Chromium coating on TA6V alloy

The "paint" is prepared as in Example 1, but from chromium fluoride $CrF_2$ instead of silver chloride AgCl. A TA6V alloy sheet is coated with this "paint", left to dry and then heated to 600° C in an oven in a vacuum. A chromium-rich diffusion zone is obtained.

EXAMPLE 21

Bronze coating on TA6V alloy

The "paint" is formed by a dispersion, in cyclohexanone, of copper fluoride $CuF_2$, copper iodide $CuI_2$ and bronze (alloy of copper and tin) in the form of a fine powder (particle size: 1 – 10 microns). The "paint" is coated on to a TA6V alloy sheet surface to be coated. After drying, the member is placed in a vacuum oven at 680° C and a layer of alloy a few microns thick and very rich in bronze is obtained which adheres perfectly to the TA6V alloy substrate. This layer can receive an electrolytic deposit which also adheres well, e.g. a deposit of nickel, chromium or gold.

EXAMPLE 22

Nickel coating on TA6V alloy

The "paint" is formed by a dispersion, in cyclohexanone, of nickel fluoride $NiF_2$ and a very fine nickel powder (particle size: about 1 – 3 microns). Proceeding with this "paint" as indicated in Example 21, a nickel coating on TA6V alloy sheet is obtained which is slightly thicker than in Example 21 but which adheres very well.

Obviously and as can be gathered from what has been stated hereinbefore, the invention is not limited to the described applications, nor to the embodiments more especially described, and in fact all variants fall within the scope of the said invention.

We claim:

1. A process for producing a resistant metal coating on the surface of a refractory metal member capable of forming at least one volatile refractory metal halide, said refractory metal member being selected from titanium, tantalum, molybdenum, niobium, tungsten and zirconium, comprising the successive steps of applying as a coating onto said surface at least one coating metal halide, said coating metal halide being stable both in the isolated state and when applied to said surface, and being less volatile than said refractory metal halide, and heating the coated surface to a temperature sufficient to react said coating metal halide with said refractory metal member, precipitate the metal of said coating metal onto said surface and volatilize off the refractory metal halide formed.

2. A process for hard soldering or brazing on a surface of a refractory metal member comprising producing a resistant metal coating on the surface of said refractory metal member by the process of claim 1 and wherein said coating metal of said coating metal halide is a soldering or brazing metal, and melting on said resistant metal coating a soldering or brazing metal or metal alloy.

3. A process according to claim 2, wherein the coating and the melting are performed simultaneously by placing a film of said soldering or brazing metal or metal alloy against said surface of said refractory metal member having applied thereon as a coating said at least one coating metal halide.

4. A process for producing an electrolytic coating on a surface of a refractory metal member according to the process of claim 1 wherein the coating metal halide is a halide of a brazing metal and the electrodeposition of the metal to be electrodeposited is performed on the surface of the refractory metal member, coated with the said metal coating having the brazing metal for its base.

5. A process according to claim 4 in which the said brazing metal consists of the metal to be electrodeposited.

6. A process according to claim 1 in which the metal of the coating metal halide is selected from the following group of metals : silver, copper, nickel, aluminium, chromium, cobalt, iron, tin, zinc.

7. A process according to claim 6 in which the metal halide is a metal fluoride.

8. A process according to claim 1, in which the metal halide is a metal chloride.

9. A process according to claim 1, in which the halide is applied in the form of a dispersion of fine particles.

10. A process according to claim 9, in which the dispersion of fine particles is applied to the said surface mechanically.

11. A process according to claim 1 wherein the refractory metal member is selected from titanium, tantalum, niobium and zirconium.

12. A process according to claim 1 wherein the coating metal halide is selected from silver, copper, nickel, aluminum, cobalt, iron, tin and zinc.

* * * * *